United States Patent
Jeyachandra et al.

(10) Patent No.: US 9,870,201 B1
(45) Date of Patent: Jan. 16, 2018

(54) METHOD AND APPARATUS FOR MODULO ARITHMETIC

(71) Applicant: MBIT WIRELESS, INC., Irvine, CA (US)

(72) Inventors: Angelin Jeyachandra, Chennai (IN); Bhaskar Patel, San Clemente, CA (US)

(73) Assignee: MBIT WIRELESS, INC., Irvine, CA (US)

( * ) Notice: Subject to any disclaimer, the term of this patent is extended or adjusted under 35 U.S.C. 154(b) by 0 days.

(21) Appl. No.: 15/060,850

(22) Filed: Mar. 4, 2016

(51) Int. Cl.
*G06F 7/72* (2006.01)
*G06F 7/535* (2006.01)

(52) U.S. Cl.
CPC .............. *G06F 7/727* (2013.01); *G06F 7/535* (2013.01)

(58) Field of Classification Search
None
See application file for complete search history.

(56) References Cited

U.S. PATENT DOCUMENTS

| | | | | |
|---|---|---|---|---|
| 5,349,551 A * | 9/1994 | Petro | ........................ | G06F 7/722 708/491 |
| 6,151,393 A * | 11/2000 | Jeong | ....................... | G06F 7/722 380/265 |
| 2003/0202657 A1* | 10/2003 | She | ............................ | G06F 7/72 380/30 |
| 2005/0105723 A1* | 5/2005 | Dupaquis | .................. | G06F 7/72 380/59 |
| 2009/0180609 A1* | 7/2009 | Douguet | .................... | G06F 7/72 380/28 |
| 2010/0146028 A1* | 6/2010 | Lambert | .................... | G06F 7/72 708/491 |

* cited by examiner

*Primary Examiner* — David H Malzahn
(74) *Attorney, Agent, or Firm* — Lerner, David, Littenberg, Krumholz & Mentlik, LLP

(57) ABSTRACT

The procedure of finding the remainder of a division is referred to as modulo operation. Modulo arithmetic is used in many applications. A method and apparatus are disclosed that enable faster and less complex implementation of modulo arithmetic for a certain class of numbers.

17 Claims, 9 Drawing Sheets

US 9,870,201 B1

METHOD AND APPARATUS FOR MODULO ARITHMETIC

BACKGROUND

Given a dividend X and a divisor N, the remainder of X divided by N is denoted as X mod N. The remainder may also be referred to as a residue.

Modulo arithmetic is used in many applications including number theory, group theory, ring theory, knot theory, abstract algebra, cryptography, computer science, chemistry and the visual and musical arts. Modulo arithmetic may be realized through recursive subtraction which may result in decreased processing throughput. A flow diagram of the conventional recursive subtraction method for modulo arithmetic computation is shown is FIG. 1.

To compute the residue of a division through recursive subtraction method for conditions where the difference between the divisor and the dividend is high, the number of iterations of subtraction is also high. The processing time for the recursive subtraction method varies as a function of the relationship between the input operands.

To perform any arithmetic operations on a continuous sequence of numbers, initial delay to get the results, known as latency, may also be critical. Furthermore, if the processing time for modulo computation of each input number varies, then additional control logic may be required and the throughput may be limited by the worst case scenario.

SUMMARY

A method and apparatus are disclosed that perform modulo arithmetic on numbers in any range and produce an output with reduced latency and require reduced hardware and therefore reduced power consumption.

In accordance with an aspect of the present disclosure, a method may compute a remainder of dividing a dividend X by a divisor N when processing a signal obtained from a processing system. The method may include controlling, by a processing device: (A) for each $i^{th}$ bit position of an n bit binary representation of the dividend X: when a value of the bit position is equal to 1, outputting, as an output for the bit position, a weight of the bit position, and when a value of the bit position is equal to 0, outputting, as the output for the bit position, a value equal to zero, in which the weights of the $i^{th}$ bit positions respectively are residues of $2^i$ mod N, wherein i=0, 1, ..., n−1; and setting the dividend X equal to a sum of the outputs for the respective bit positions.

In one alternative, a value of p may be equal to one when (A) is performed a first time, and the method may include controlling, by the processing device: (B) when $N \leq X^{(p)} < 2^{\lceil \log_2 N \rceil}$ is determined to be true, subtracting N from the dividend X to obtain a final remainder X mod N, in which $X^{(p)}$ is equal to the value of X when (A) is performed a $p^{th}$ time, and when $N \leq X^{(p)} < 2^{\lceil \log_2 N \rceil}$ is determined not to be true, performing (A) and then performing (B), in which p is incremented by one each time (A) is performed after (A) is performed the first time.

In one alternative, when (A) is performed a given time, the sum of the outputs for the respective bit positions at the given time (A) is performed may be determined by an adder, in which the adder has a bit size according to a value of p corresponding to the given time (A) is performed and is supplied with the outputs for the respective bit positions at the given time (A) is performed.

In accordance with an aspect of the present disclosure, a method for modulo 3 computation of a remainder of dividing a dividend X by a divisor N when processing a signal obtained from a processing system, may include controlling, by a processing device: (A) for each even $i^{th}$ bit position of an n bit binary representation of the dividend X: outputting, as an output for the bit position, a value of the bit position, and for each odd $i^{th}$ bit position of the n bit binary representation of the dividend X outputting, as the output for the bit position, a value equal to zero when the value of the bit position is equal to zero and a value equal to two when the value of the bit position is equal to one; setting the dividend X equal to a sum of the outputs for the respective bit positions.

In one alternative of the method, a value of p may be equal to one when (A) is performed a first time, and the method may include controlling, by the processing device: (B) when $N \leq X^{(p)} < 2^{\lceil \log_2 N \rceil}$ is determined to be true, determining a final remainder X mod N to be equal to zero, in which $X^{(p)}$ is a value of X when (A) is performed a $p^{th}$ time, and when $N \leq X^{(p)} < 2^{\lceil \log_2 N \rceil}$ is determined not to be true, performing (A) and then performing (B), in which p is incremented by one each time (A) is performed after (A) is performed the first time, and (A) is performed not more than three times.

In one alternative, when (B) is performed, p is equal to 3 and $N \leq X^{(p)} < 2^{\lceil \log_2 N \rceil}$ is determined not to be true, the final remainder X mod N may be determined to be equal to $X^{(p)}$.

In one alternative, the output for each odd $i^{th}$ bit position of the n bit binary representation may be obtained by providing the value of the odd $i^{th}$ bit position to a shifter that performs a binary left shift operation.

In one alternative, when (A) is performed a given time, the sum of the outputs for the respective bit positions at the given time (A) is performed may be determined by an adder.

In accordance with an aspect of the present disclosure, a method for computation of a remainder of dividing a dividend X by a divisor N when processing a signal obtained from a processing system, may include controlling, by a processing device, for an n bit binary representation of the dividend X: for each $i^{th}$ bit position of the n bit representation, when a value of the bit position is equal to 1, outputting, as an output for the bit position, a weight of the bit position, and when a value of the bit position is equal to 0, outputting, as the output for the bit position, a value equal to zero, in which the weights of the $i^{th}$ bit positions are respectively equal to $2^i$ modulo N, wherein i=0, 1, ..., n−1; and controlling, by the processing device, determining, as the remainder, a sum of predetermined outputs of the outputs for the respective bit positions, in which the predetermined outputs include all of the outputs, except each at least two outputs of the outputs forming a modulo N bit pair, and in which the at least two outputs forming a given modulo N bit pair (i) are obtained for bit positions of the dividend having a value equal to one and (ii) have respective weights, in which a sum of the respective weights is equal to N.

In one alternative, the at least two outputs forming the given modulo N bit pair may correspond to at least two adjacent first and second bit positions of the n bit binary representation of the dividend.

In accordance with an aspect of the present disclosure, an apparatus may compute a remainder of dividing a dividend X by a divisor N when processing a signal obtained from a processing system. The apparatus may include circuitry configured to control: (A) for each $i^{th}$ bit position of an n bit binary representation of the dividend X: when a value of the bit position is equal to 1, outputting, as an output for the bit position, a weight of the bit position, and when a value of the bit position is equal to 0, outputting, as the output for the bit position, a value equal to zero, in which the weights of the $i^{th}$ bit positions respectively are residues of $2^i$ mod N, wherein i=0, 1, . . . , n−1; and setting the dividend X equal to a sum of the outputs for the respective bit positions.

In one alternative of the apparatus, a value of p may be equal to one when (A) is performed a first time, and the circuitry may be configured to control: (B) when $N \leq X^{(p)} < 2^{\lceil log_2 N \rceil}$ is determined to be true, subtracting N from the dividend X to obtain a final remainder X mod N, in which $X^{(p)}$ is equal to the value of X when (A) is performed a $p^{th}$ time, and when $N \leq X^{(p)} < 2^{\lceil log_2 N \rceil}$ is determined not to be true, performing (A) and then performing (B), in which p is incremented by one each time (A) is performed after (A) is performed the first time.

In one alternative of the apparatus, when (A) is performed a given time, the sum of the outputs for the respective bit positions at the given time (A) is performed may be determined by an adder of the circuitry, in which the adder has a bit size according to a value of p corresponding to the given time (A) is performed and is supplied with the outputs for the respective bit positions at the given time (A) is performed.

In accordance with an aspect of the present disclosure, an apparatus may be for modulo 3 computation of a remainder of dividing a dividend X by a divisor N when processing a signal obtained from a processing system. The apparatus may include circuitry configured to control: (A) for each even $i^{th}$ bit position of an n bit binary representation of the dividend X: outputting, as an output for the bit position, a value of the bit position, and for each odd $i^{th}$ bit position of the n bit binary representation of the dividend X outputting, as the output for the bit position, a value equal to zero when the value of the bit position is equal to zero and a value equal to two when the value of the bit position is equal to one; setting the dividend X equal to a sum of the outputs for the respective bit positions.

In one alternative of the apparatus, a value of p may be equal to one when (A) is performed a first time, and the circuitry may be configured to control: (B) when $N \leq X^{(p)} < 2^{\lceil log_2 N \rceil}$ is determined to be true, determining a final remainder X mod N to be equal to zero, in which $X^{(p)}$ is a value of X when (A) is performed a $p^{th}$ time, and when $N \leq X^{(p)} < 2^{\lceil log_2 N \rceil}$ is determined not to be true, performing (A) and then performing (B), in which p is incremented by one each time (A) is performed after (A) is performed the first time, and (A) is performed not more than three times.

In one alternative of the apparatus, when (B) is performed, p is equal to 3 and $N \leq X^{(p)} < 2^{\lceil log_2 N \rceil}$ is determined not to be true, the final remainder X mod N may be determined to be equal to X.

In one alternative of the apparatus, the output for each odd $i^{th}$ bit position of the n bit binary representation may be obtained by providing the value of the odd $i^{th}$ bit position to a shifter of the circuitry that performs a binary left shift operation.

In one alternative of the apparatus, when (A) is performed a given time, the sum of the outputs for the respective bit positions at the given time (A) is performed may be determined by an adder of the circuitry.

In accordance with an aspect of the present disclosure, an apparatus may be for computation of a remainder of dividing a dividend X by a divisor N when processing a signal obtained from a processing system. The apparatus may include circuitry configured to control, for an n bit binary representation of the dividend X: for each $i^{th}$ bit position of the n bit representation, when a value of the bit position is equal to 1, outputting, as an output for the bit position, a weight of the bit position, and when a value of the bit position is equal to 0, outputting, as the output for the bit position, a value equal to zero, in which the weights of the $i^{th}$ bit positions are respectively equal to $2^i$ modulo N, wherein i=0, 1, . . . , n−1; and wherein the circuitry is configured to control determining, as the remainder, a sum of predetermined outputs of the outputs for the respective bit positions, in which the predetermined outputs include all of the outputs, except each at least two outputs of the outputs forming a modulo N bit pair, and in which the at least two outputs forming a given modulo N bit pair (i) are obtained for bit positions of the dividend having a value equal to one and (ii) have respective weights, in which a sum of the respective weights is equal to N.

In one alternative of the apparatus, the at least two outputs forming the given modulo N bit pair may correspond to at least two adjacent first and second bit positions of the n bit binary representation of the dividend.

In accordance with an aspect of the present disclosure, a communication device may include a receiver to receive a signal; and a processing device to control computation of a remainder of dividing a dividend X by a divisor N when processing the signal. The processing device may be configured to control: (A) for each $i^{th}$ bit position of an n bit binary representation of the dividend X: when a value of the bit position is equal to 1, outputting, as an output for the bit position, a weight of the bit position, and when a value of the bit position is equal to 0, outputting, as the output for the bit position, a value equal to zero, in which the weights of the $i^{th}$ bit positions respectively are residues of $2^i$ mod N, wherein i=0, 1, . . . , n−1; and setting the dividend X equal to a sum of the outputs for the respective bit positions.

In accordance with an aspect of the present disclosure, a communication device may include a receiver to receive a signal; and a processing device for modulo 3 computation of a remainder of dividing a dividend X by a divisor N when processing the signal. The processing device may be configured to control: (A) for each even $i^{th}$ bit position of an n bit binary representation of the dividend X: outputting, as an output for the bit position, a value of the bit position, and for each odd $i^{th}$ bit position of the n bit binary representation of the dividend X outputting, as the output for the bit position, a value equal to zero when the value of the bit position is equal to zero and a value equal to two when the value of the bit position is equal to one; setting the dividend X equal to a sum of the outputs for the respective bit positions.

In accordance with an aspect of the present disclosure, a communication device may include a receiver to receive a signal; and a processing device for computation of a remainder of dividing a dividend X by a divisor N when processing the signal. The processing device may be configured to control, for an n bit binary representation of the dividend X: for each $i^{th}$ bit position of the n bit representation, when a value of the bit position is equal to 1, outputting, as an output for the bit position, a weight of the bit position, and when a value of the bit position is equal to 0, outputting, as the output for the bit position, a value equal to zero, in which the weights of the $i^{th}$ bit positions are respectively equal to $2^i$ modulo N, wherein i=0, 1, . . . , n−1; and wherein the processing device is configured to control, determining, as the remainder, a sum of predetermined outputs of the outputs for the respective bit positions, in which the predetermined outputs include all of the outputs, except each at least two outputs of the outputs forming a modulo N bit pair, and in which the at least two outputs forming a given modulo N bit pair (i) are obtained for bit positions of the dividend having a value equal to one and (ii) have respective weights, in which a sum of the respective weights is equal to N.

DETAILED DESCRIPTION

Figure 1:
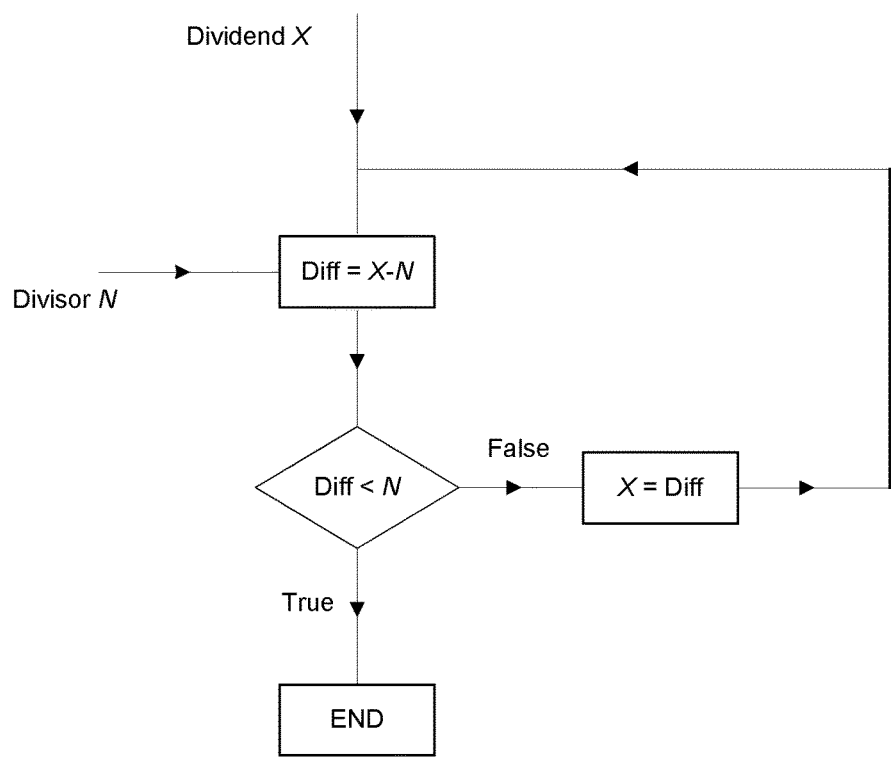
FIG. 1 illustrates a conventional recursive subtraction method of computing a remainder of a division.

The foregoing aspects, features and advantages of the present disclosure will be further appreciated when considered with reference to the following description of exemplary embodiments and accompanying drawings, wherein like reference numerals represent like elements. In describing the exemplary embodiments of the disclosure illustrated in the appended drawings, specific terminology will be used for the sake of clarity. However, the disclosure is not intended to be limited to the specific terms used.

Let the modulo arithmetic to be performed be denoted by (X mod N) where X is the dividend and N is the divisor. Modulo arithmetic is generally performed on integer numbers. Let the integer X be represented as an n-bit binary number.

Figure 2:
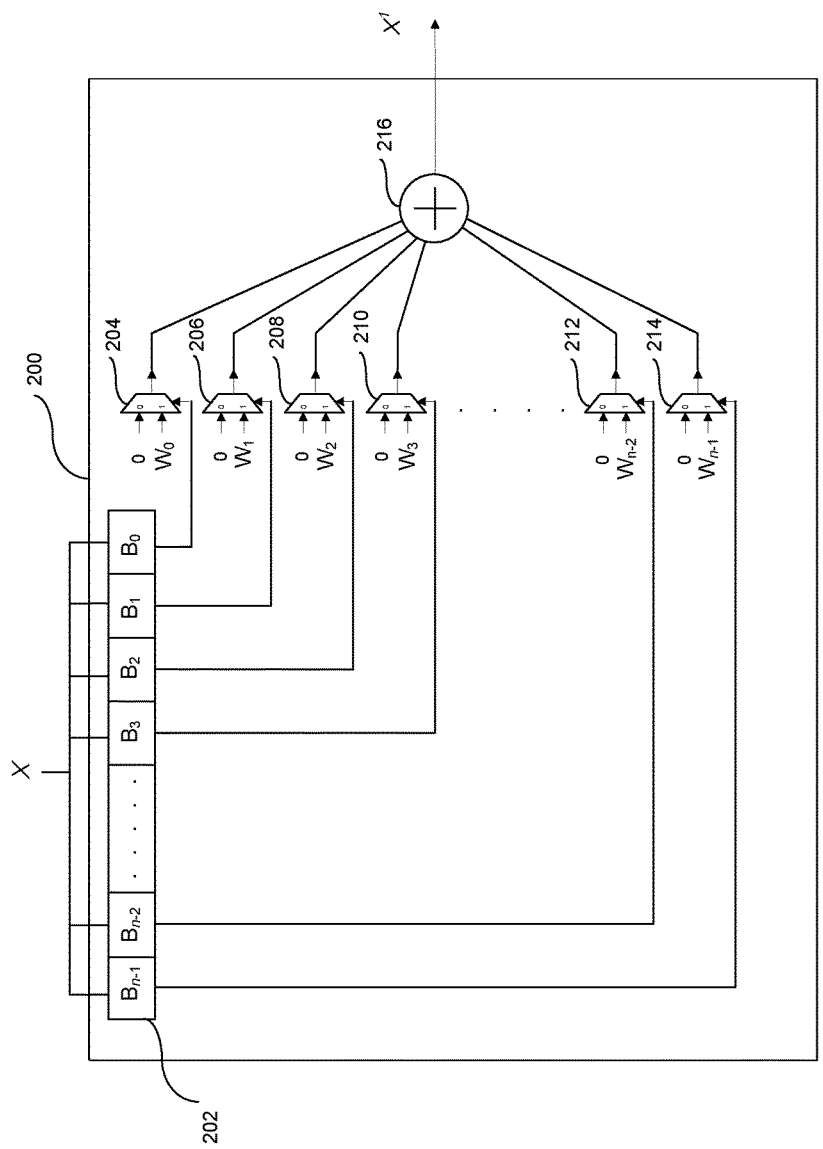
FIG. 2 illustrates a Residue Computation Unit according to the aspects of the present disclosure.
Figure 3:
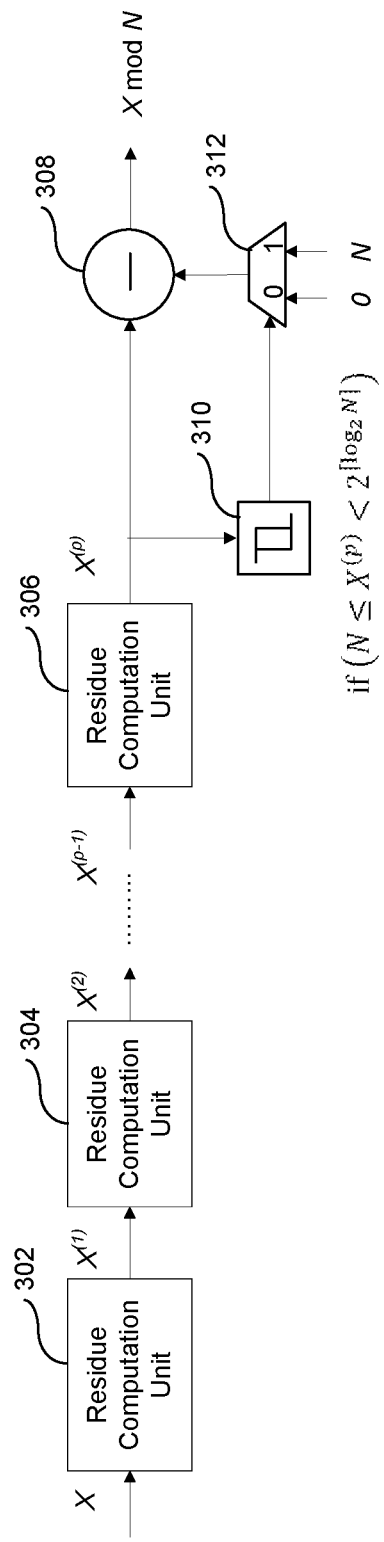
FIG. 3 illustrates pipelined Residue Computation Units and final subtraction unit according to the aspects of the present disclosure.

According to an aspect of the present disclosure, the modulo N residues for all numbers which are powers of two starting from $2^0$ to $2^{n-1}$ are assigned as weights to the corresponding bit positions starting from $0^{th}$ bit to the $(n-1)^{th}$ bit of the dividend X. According to another aspect of the present disclosure, if the value of a bit in a particular position in the binary representation of the dividend X is 1, then its corresponding weight is selected and added with the weight of other such bits as illustrated in FIG. 2. The circuit in FIG. 2 is referred to as Residue Computation Unit 200 as per the aspects of the present disclosure. The binary representation of the number X is input to the Residue Computation Unit in the n-bit register 202 with bit positions $B_0$, $B_1$, ..., $B_{n-1}$. The weights $W_0$, $W_1$, ..., $W_{n-1}$, etc., are the residues of $2^0$ mod N, $2^1$ mod N, $2^2$ mod N, ..., $2^{n-1}$ mod N, etc., respectively for a given divisor N and are input to the multiplexers 204, 206, ..., 214. According to the aspects of the present disclosure, the input selection for the multiplexers is done based on the value of the respective bit positions $B_0$, $B_1$, ..., $B_{n-1}$. According to another aspect of the present disclosure, the output of the multiplexers is added together using the adder 216. The output of the adder is treated as a new dividend $X^{(1)}$ and given to another Residue Computation Unit in pipeline architecture as illustrated in FIG. 3. Multiple instances of Residue Computation Units 302, 304, to 306 are used as illustrated in FIG. 3.

After a few pipeline stages of Residue Computation Unit, the dividend will converge from X to (X mod N). The number of pipeline stages may be determined based on the bit width of the dividend and the divisor. After a $p^{th}$ pipeline stage of Residue Computation Unit, the bit width of the dividend $X^{(p)}$ converges from $(\lceil \log_2 N^{(p)} \rceil)$ to $\lceil \log_2 (N*(\lceil \log_2 (X^{(p)}) \rceil - \lceil \log_2(N) \rceil)) \rceil$ where $\lceil \cdot \rceil$ represents ceiling operation defined as the smallest integer not less than its argument. Hence the convergence from X to the final residue (X mod N) is faster for smaller divisors. If the initial dividend X or the intermediate dividend $X^{(p)}$ lie in the range N to $2^{\lceil \log_2 N \rceil}$, convergence from X to (X mod N) may not occur. According to another aspect of the present disclosure, for further convergence, a subtractor 308 in a single stage may be used which may subtract N from the initial or intermediate dividend for cases where the output of the comparator 310 is logic high which determines whether the dividend lies in the range N to $2^{\lceil \log_2 N \rceil}$ as shown in FIG. 3, i.e., if $N \leq X^{(p)} < 2^{\lceil \log_2 N \rceil}$ is true. Furthermore, if the condition checked in comparator 310 is true, then the subtraction is the last computation for getting the final residue (X mod N). The multiplexer 312 provides the selection between the two possible values of 0 or N for second input to the subtractor 308 under control of the output of the comparator 310.

According to another aspect of the present disclosure, all the pipeline stages may be similar in structure except for the number of bits each stage can handle. Each subsequent pipeline stage always uses smaller bit width than the current pipeline stage. The size of every pipeline stage, i.e., the size of the adder in every pipeline stage may be determined based on the maximum bit width of the divisor and the dividend for a given stage.

Figure 4:
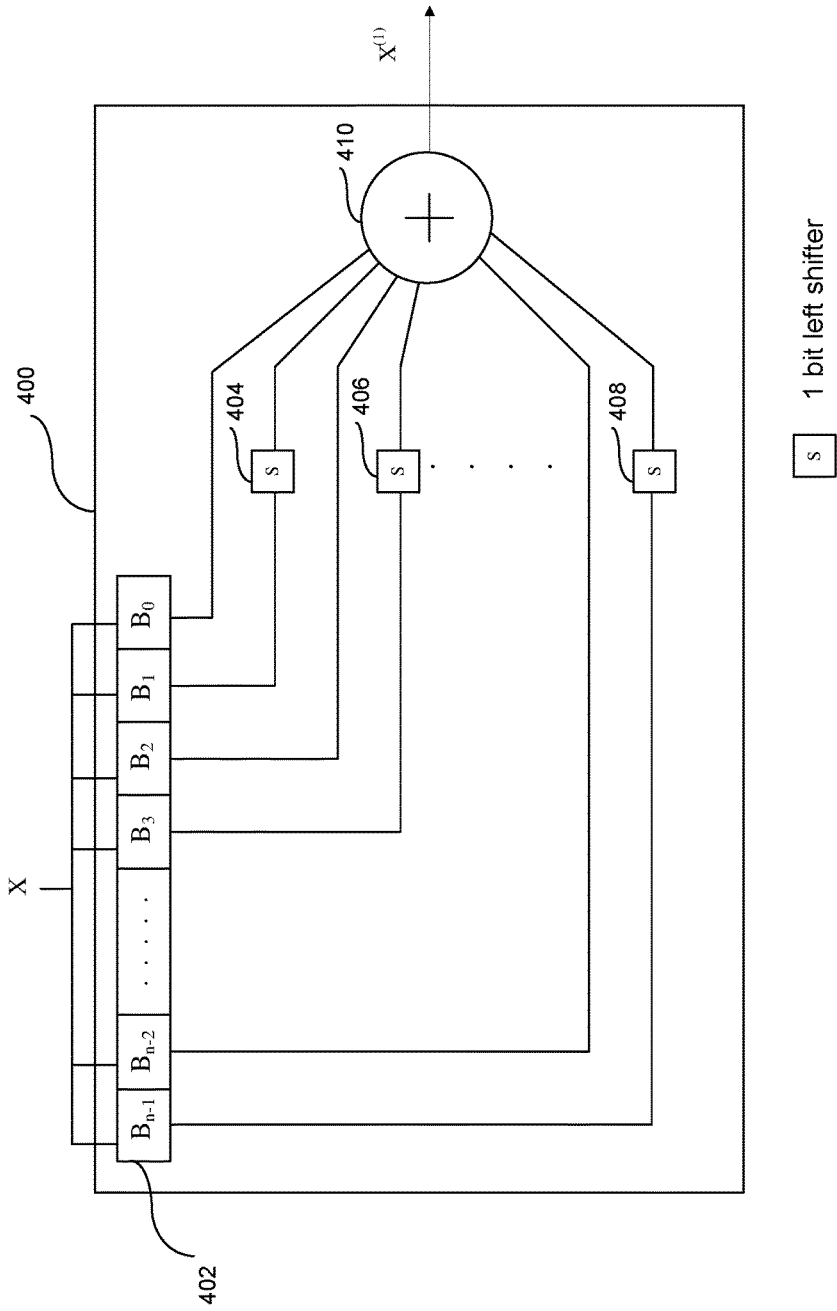
FIG. 4 illustrates a Residue Computation Unit when the divisor is 3 according to the aspects of the present disclosure.

According to another aspect of the present disclosure, for modulo 3 arithmetic, the weights of the odd bits are one and the weights of the even bits are two. FIG. 4 illustrates the modulo 3 Residue Computation Unit 400. It receives the binary representation of the number X in the n-bit register 402 with bit positions $B_0$, $B_1$, ..., $B_{n-1}$. The Residue Computation Unit 400 in FIG. 4 is implemented using shifters 404, 406, and 408 for odd bit positions only, and an adder 410 in which weights for the respective bit positions are summed. The use of shifters, and only for odd bit positions, reduces hardware complexity compared to the Residue Computation Unit illustrated in FIG. 3.

For example, referring to FIG. 4, the weight is either 0, 1 or 2 for a bit position of an n-bit number. If a $k^{th}$ bit value is 0, then its weight is zero. If a $k^{th}$ bit value is 1, then its weight is $2^k$ modulo 3=2 if k is odd, and $2^k$ modulo 3=1 if k is even. For example, if k=2, $2^2$=4, and 4 mod 3=1. For example, if k=3, $2^3$=8, and 8 mod 3=2. A weight of 2 can be obtained by left shifting a bit value of 1, i.e., (1<<1)=2 (in binary "10", where the zero is padded as part of a left shift). Therefore, for the odd bit positions, the value of the bit position is used after a left shift by 1 for the addition in the adder 410, and when the value of the bit position is zero, the bit value may be zero because left shifting a zero still remains a zero. In addition, a weight of 1 can be obtained directly from the value of 1 for the particular bit position itself. Therefore, for the even bit positions, the value of the bit position is used directly for the addition in the adder 410. The same applies for the even bit positions where the bit value may be zero.

Figure 5:
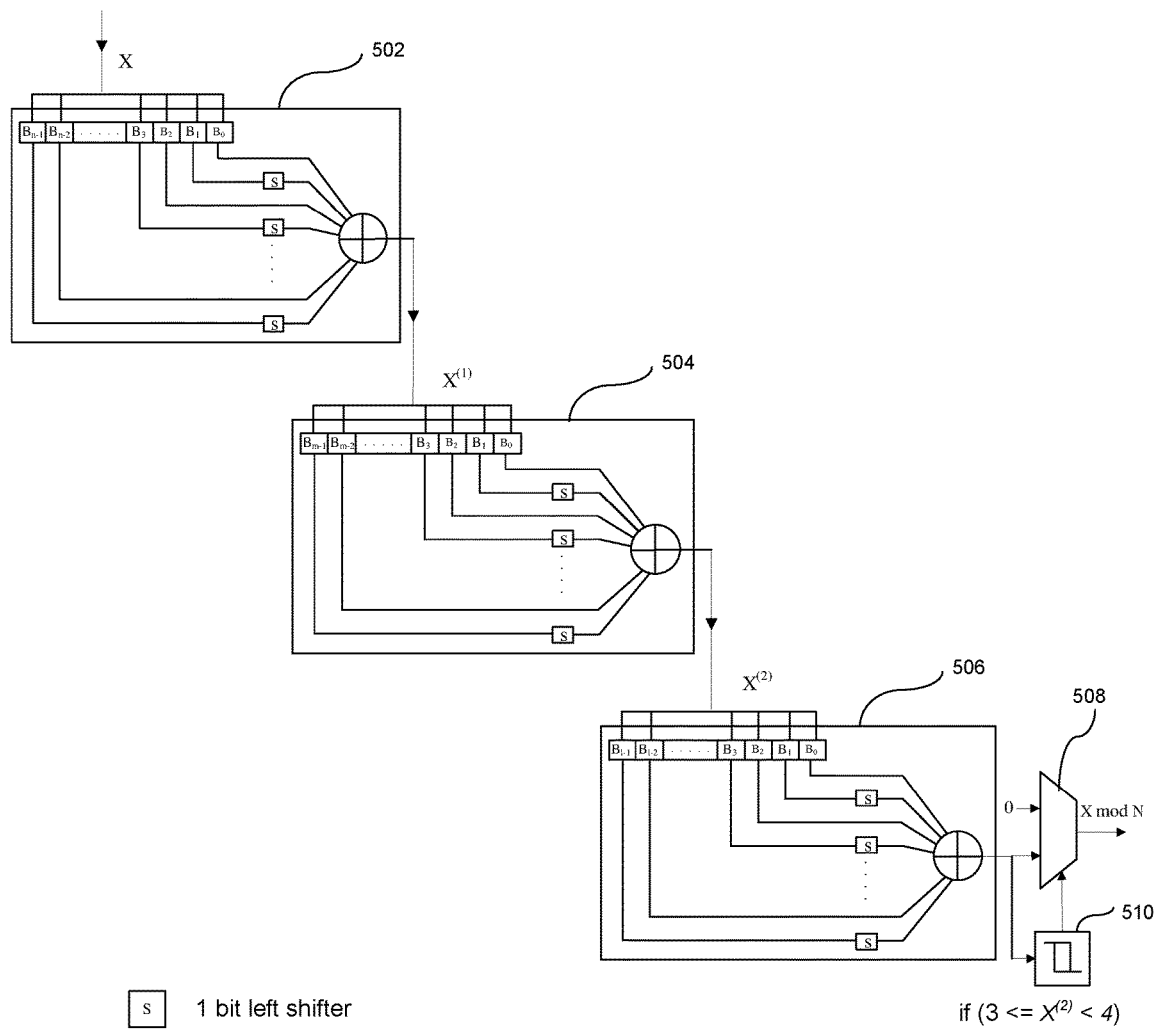
FIG. 5 illustrates pipelined Residue Computation Units and final multiplexing unit when the divisor is 3 according to the aspects of the present disclosure.

The modulo 3 residue computation using a set of three pipelined Residue Computation Units 502, 504, and 506 hardware is illustrated in FIG. 5. According to another aspect of the present disclosure, the final subtraction stage is replaced by a multiplexer 508 because if the condition $N \leq X^{(p)} < 2^{\lceil log_2 N \rceil}$ checked in comparator 510 for stage $X^{(p)}$ in the pipeline, where p=1 or 2, is true, then the intermediate residue is 3 and the final residue will be zero which may be obtained using a multiplexer instead of a subtractor. When the comparator 520 condition is not true at stage $X^{(p)}$ where p=2, the output of the multiplexer (X mod N as a final remainder) is the output of the Residue Computation Unit 506.

A second method for residue computation is disclosed. This method is applicable to a subset of divisors where the weights of the bits of the dividend follow a regular pattern. According to an aspect of the present disclosure, a regular pattern may be identified when the sum of their weights equals the value of the divisor. These pairs are referred to as modulo pairs. For example, for modulo 12 arithmetic, the weights of the bit positions of the dividend follow a regular pattern of 4 and 8. Any two bit positions of the dividend with value of 1 which carry a weight of 4 and 8 may be referred to as modulo bit pair and 4 and 8 are referred to as members of the modulo bit pair. According to another aspect of the present disclosure, the modulo bit pairs need not necessarily be weights of adjacent bits alone. According to another aspect of the present disclosure, by ignoring all modulo bit pairs and finding the sum of the weights of the remaining bit positions may give the residue.

Figure 6:
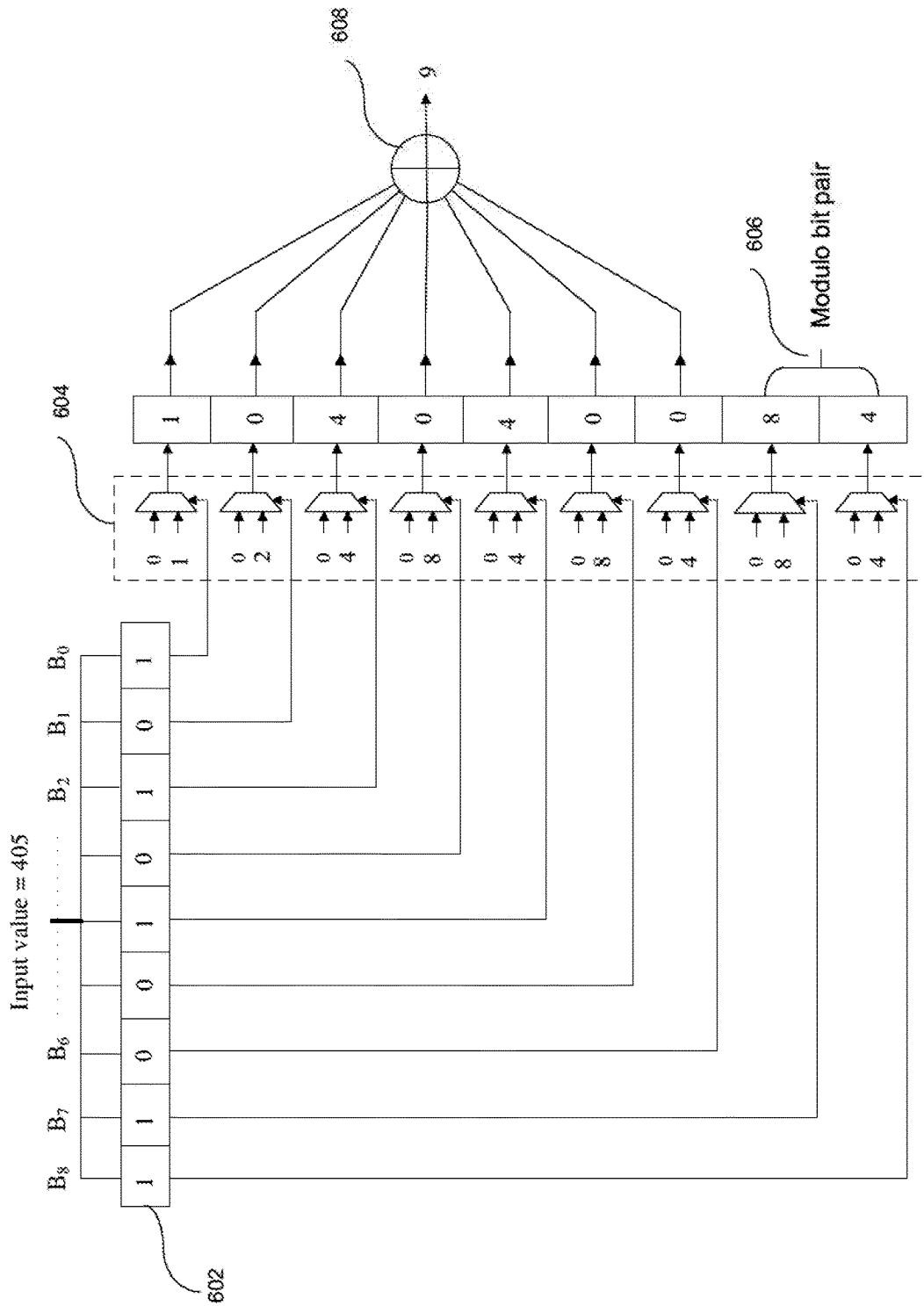
FIG. 6 illustrates a Residue Computation Unit when the divisor is such that weights of modulo pairs can be dropped from addition according to the aspects of the present disclosure.

For example, let the dividend be 405 and the divisor be 12. Residue computation for the given dividend and divisor by the second method for residue computation is illustrated in FIG. 6. As shown in the figure, the dividend is input to the register 602 and it has three bit positions with weight four, one bit position with weight eight and one bit position with weight one. Out of three weights of 4 and one weight of 8, only one modulo bit pair 606 can be formed. Leaving that modulo bit pair and adding the remaining weights output from the multiplexer bank 604 using the adder 608 may contribute to faster convergence and reduced complexity adders. Referring to FIG. 6, for example, the place value of $B_8$ and $B_7$ is $2^8=256$ and $2^7=128$ respectively. For the modulo 12 operation, the weights for these bit positions are 256 modulo 12=4 and 128 modulo 12=8, where the weight of a bit $B_i$, where i=0, 1, . . . , n−1, is determined according to $2^i$ mod N. The weights for bits $B_8$ and B7, when added, become 12, and for the modulo 12 operation this sum is an integral of 12 and will not contribute to the remainder and therefore need not be considered in the addition module 608.

According to another aspect of the disclosure, weights of any combination of respective bit positions may be added together to obtain a value equal to the divisor and all such weights, which do not contribute to the remainder, may be dropped from the addition of the weights.

Both of the methods for modulo arithmetic are efficient for cases where the difference between the dividend and the divisor is high.

The aspects of the present disclosure are applicable to cases where the divisor is fixed and known a priori. An example application for the present method is for the $3^{rd}$ Generation Partnership Project (3GPP) Long Term Evolution (LTE) wireless communication system. In 3GPP LTE wireless communication system, there are many instances that require modulo arithmetic with fixed divisors such as 3, 6, 12, etc. The present method is well suited to such applications. For high data throughput applications such as 3GPP LTE wireless communication system, where modulo results may be required in every clock cycle for dividends of large bit width, other existing methods such as Non-Restoring Division (NRD) may require a fully pipelined design with number of pipeline stages equal to the number of bits in the dividend which may lead to increased complexity and hardware requirement. In such applications, the proposed method may be well suited with limited number of pipeline stages. Although the 3GPP LTE wireless communication system is cited as one application example for the present disclosure, it is applicable to any processing system that requires fast residue (remainder) computation.

Figure 7:
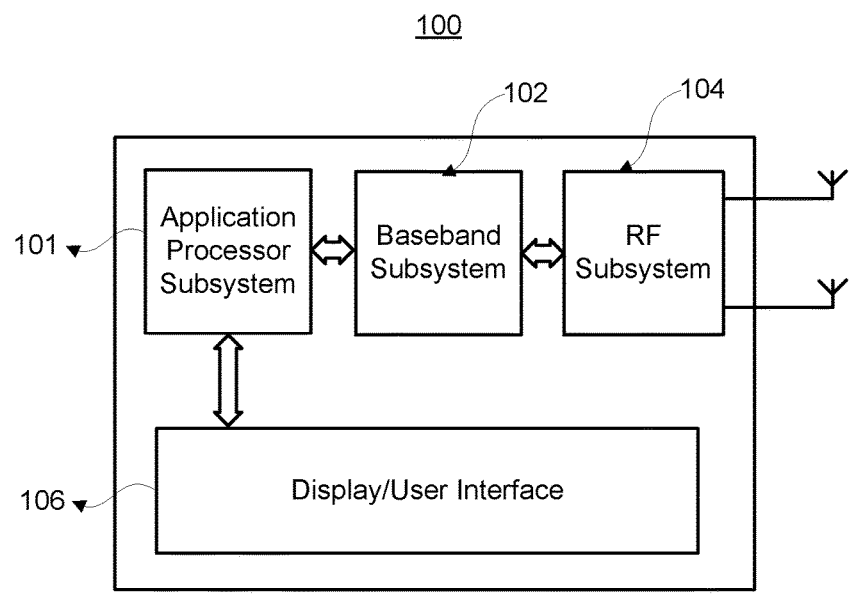
FIG. 7 illustrates a wireless mobile station diagram, which may be employed with aspects of the disclosure described herein.

By way of example only, the above-described method may be implemented in a receiver, e.g., a user device such as a wireless mobile station (MS) 100 as shown in FIG. 7.

As shown in FIG. 7, MS 100 may include an application processor subsystem 101, baseband subsystem 102 and a radio frequency (RF) subsystem 104 for use with a wireless communication network. A display/user interface 106 provides information to and receives input from the user. By way of example, the user interface may include one or more actuators, a speaker and a microphone. In some mobile devices, certain combination of the application processor subsystem 101, the baseband subsystem 102 and the RF subsystem 104 are all integrated as one integrated chip.

Figure 8:
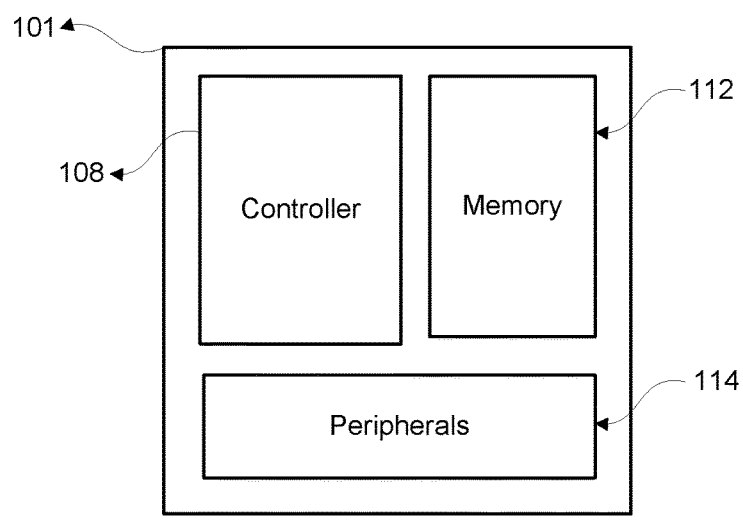
FIG. 8 illustrates an application processor subsystem for a wireless mobile station, which may be employed with aspects of the disclosure described herein.
Figure 9:
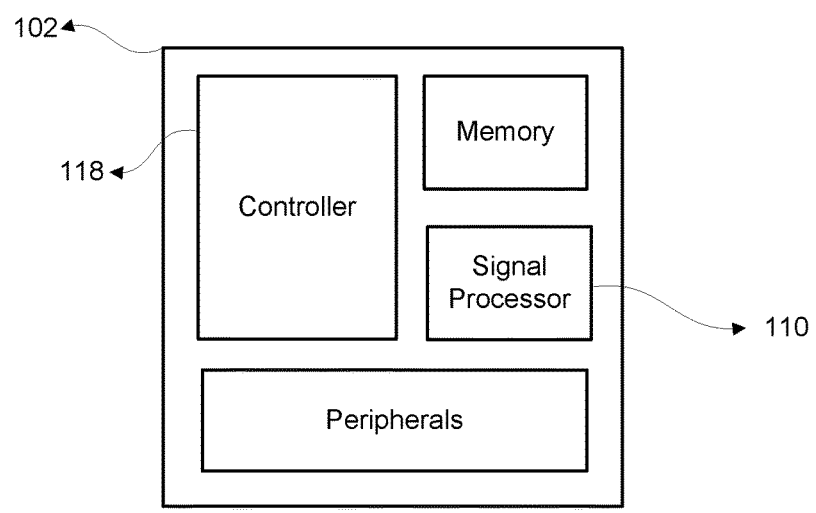
FIG. 9 illustrates a baseband subsystem for a wireless mobile station, which may be employed with aspects of the disclosure described herein.
Figure 10:
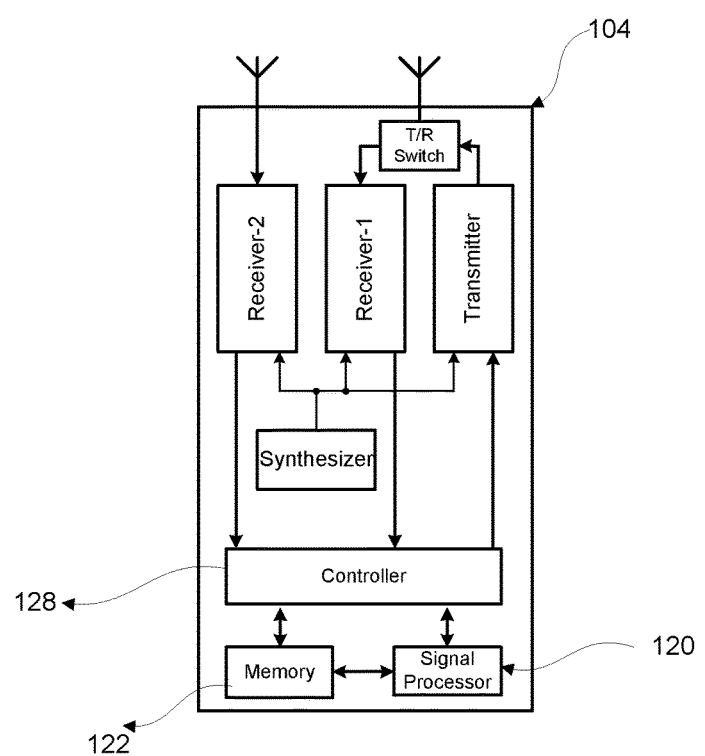
FIG. 10 illustrates a Radio Frequency (RF) subsystem for a wireless mobile station, which may be employed with aspects of the disclosure described herein.

The application processor subsystem 101 as shown in FIG. 8 may include a controller 108 such as a microcontroller, another processor or other circuitry. The baseband subsystem 102 as shown in FIG. 9 may include a controller 118 such as a microcontroller or other processor. The RF subsystem 104 as shown in FIG. 10 may include a controller 128 such as a microcontroller, another processor or other circuitry. The controller 108 desirably handles overall operation of the MS 100. This may be done by any combination of hardware, software and firmware running on the controller 108. Such a combination of hardware, software and firmware may embody any methods in accordance with aspects of the present disclosure.

Peripherals 114 such as a full or partial keyboard, video or still image display, audio interface, etc may be employed and managed through the controller 108.

Aspects of the present disclosure may be implemented in firmware of the controller 108 of the application processor and/or the controller 118 of the baseband subsystem. In another alternative, aspects of the present disclosure may also be implemented as a combination of firmware and hardware of the application processor subsystem 101 and/or the baseband subsystem 102. For instance, a signal processing entity of any or all of the FIG. 9 may be implemented in firmware, hardware and/or software. It may be part of the baseband subsystem, the receiver subsystem or be associated with both subsystems. In one example, the controller 118 and/or the signal processor 110 may include or control the protocol entity circuitry. The software may reside in internal or external memory and any data may be stored in such memory. The hardware may be an application specific integrated circuit (ASIC), field programmable gate array (FPGA), discrete logic components or any combination of such devices. The terms controller and processor are used interchangeably herein.

The consumer electronics devices that may use the aspects of the disclosure may include smartphones, tablets, laptops, gaming consoles, cameras, video camcorders, TV, car entertainment systems, etc.

Although aspects of the disclosure herein have been described with reference to particular embodiments, it is to be understood that these embodiments are merely illustrative of the principles and applications of the aspects of the present disclosure. It is therefore to be understood that numerous modifications may be made to the illustrative embodiments and that other arrangements may be devised without departing from the spirit and scope of the aspects of the present disclosure as defined by the appended claims. Aspects of each embodiment may be employed in the other embodiments described herein.

The invention claimed is:

1. A method for computation of a remainder of dividing a dividend X by a divisor N when processing a signal obtained from a processing system, the method comprising:
   controlling, by a processing device:
   (A) for each $i^{th}$ bit position of an n bit binary representation of the dividend X:
      when a value of the bit position is equal to 1, outputting, as an output for the bit position, a weight of the bit position, and
      when a value of the bit position is equal to 0, outputting, as the output for the bit position, a value equal to zero,
      in which the weights of the $i^{th}$ bit positions respectively are residues of $2^i$ mod N, wherein i=0, 1, . . . , n−1; and
      setting the dividend X equal to a sum of the outputs for the respective bit positions; and
   wherein a value of p is equal to one when (A) is performed a first time, and controlling, by the processing device:
   (B) when $N \leq X^{(p)} < 2^{\lceil log_2 N \rceil}$ is determined to be true, subtracting N from the dividend X to obtain a final remainder X mod N, in which $X^{(p)}$ is equal to the value of X when (A) is performed a $p^{th}$ time, and
      when $N \leq X^{(p)} < 2^{\lceil log_2 N \rceil}$ is determined not to be true, performing (A) and then performing (B),
   in which p is incremented by one each time (A) is performed after (A) is performed the first time,
   wherein, when (A) is performed a given time, the sum of the outputs for the respective bit positions at the given time (A) is performed is determined by an adder,
   in which the adder has a bit size according to a value of p corresponding to the given time (A) is performed and is supplied with the outputs for the respective bit positions at the given time (A) is performed.

2. A method for modulo 3 computation of a remainder of dividing a dividend X by a divisor N when processing a signal obtained from a processing system, the method comprising:
   controlling, by a processing device:
   (A) for each even $i^{th}$ bit position of an n bit binary representation of the dividend X:
      outputting, as an output for the bit position, a value of the bit position, and for each odd $i^{th}$ bit position of the n bit binary representation of the dividend X
      outputting, as the output for the bit position, a value equal to zero when the value of the bit position is equal to zero and a value equal to two when the value of the bit position is equal to one; and
      setting the dividend X equal to a sum of the outputs for the respective bit positions,
      wherein the output for each odd $i^{th}$ bit position of the n bit binary representation is obtained by providing the value of the odd $i^{th}$ bit position to a shifter that performs a binary left shift operation.

3. The method of claim 2,
   wherein a value of p is equal to one when (A) is performed a first time, and
   the method further comprising:
   controlling, by the processing device:
   (B) when $N \leq X^{(p)} < 2^{\lceil log_2 N \rceil}$ is determined to be true, determining a final remainder X mod N to be equal to zero, in which $X^{(p)}$ is a value of X when (A) is performed a $p^{th}$ time, and
      when $N \leq X^{(p)} < 2^{\lceil log_2 N \rceil}$ is determined not to be true, performing (A) and then performing (B),
   in which p is incremented by one each time (A) is performed after (A) is performed the first time, and (A) is performed not more than three times.

4. The method of claim 3,
   wherein, when (B) is performed, p is equal to 3 and $N \leq X^{(p)} < 2^{\lceil log_2 N \rceil}$ is determined not to be true, the final remainder X mod N is determined to be equal to $X^{(p)}$.

5. The method of claim 2,
   wherein, when (A) is performed a given time, the sum of the outputs for the respective bit positions at the given time (A) is performed is determined by an adder.

6. A method for computation of a remainder of dividing a dividend X by a divisor N when processing a signal obtained from a processing system, the method comprising:
   controlling, by a processing device, for an n bit binary representation of the dividend X:
      for each $i^{th}$ bit position of the n bit representation input in an n bit register,
         when a value of the bit position at the n bit register is equal to 1, outputting, as an output of the register for the bit position, a weight of the bit position, and
         when a value of the bit position at the n bit register is equal to 0, outputting, as the output of the register for the bit position, a value equal to zero,
         in which the weights of the bit positions are respectively equal to $2^i$ modulo N, wherein i=0, 1, . . . , n−1; and
   controlling, by the processing device, determining, as the remainder, a sum of predetermined outputs of the outputs for the respective bit positions by an adder having a bit size equal to the number of the predetermined outputs,
      in which the predetermined outputs include all of the outputs, in which a number of all of the outputs is n, except each at least two outputs of the outputs forming a modulo N bit pair, and
      in which the at least two outputs forming a given modulo N bit pair (i) are obtained for bit positions of the dividend having a value equal to one and (ii) have respective weights, in which a sum of the respective weights is equal to N.

7. The method of claim 6,
   wherein the at least two outputs forming the given modulo N bit pair correspond to at least two adjacent first and second bit positions of the n bit binary representation of the dividend.

8. An apparatus for computation of a remainder of dividing a dividend X by a divisor N when processing a signal obtained from a processing system, the apparatus comprising:
   circuitry configured to control:
   (A) for each $i^{th}$ bit position of an n bit binary representation of the dividend X:

11 when a value of the bit position is equal to 1, outputting, as an output for the bit position, a weight of the bit position, and when a value of the bit position is equal to 0, outputting, as the output for the bit position, a value equal to zero, in which the weights of the $i^{th}$ bit positions respectively are residues of $2^i$ mod N, wherein i=0, 1, ..., n−1; and setting the dividend X equal to a sum of the outputs for the respective bit positions; and wherein a value of p is equal to one when (A) is performed a first time, and wherein the circuitry is configured to control:

(B) when $N \leq X^{(p)} < 2^{\lceil log_2 N \rceil}$ is determined to be true, subtracting N from the dividend X to obtain a final remainder X mod N, in which $X^{(p)}$ is equal to the value of X when (A) is performed a $p^{th}$ p time, and when $N \leq X^{(p)} < 2^{\lceil log_2 N \rceil}$ is determined not to be true, performing (A) and then performing (B), in which p is incremented by one each time (A) is performed after (A) is performed the first time, wherein, when (A) is performed a given time, the sum of the outputs for the respective bit positions at the given time (A) is performed is determined by an adder of the circuitry, in which the adder has a bit size according to a value of p corresponding to the given time (A) is performed and is supplied with the outputs for the respective bit positions at the given time (A) is performed.

9. An apparatus for modulo 3 computation of a remainder of dividing a dividend X by a divisor N when processing a signal obtained from a processing system, the apparatus comprising:

circuitry configured to control:

(A) for each even $i^{th}$ bit position of an n bit binary representation of the dividend X:

outputting, as an output for the bit position, a value of the bit position, and for each odd $i^{th}$ bit position of the n bit binary representation of the dividend X outputting, as the output for the bit position, a value equal to zero when the value of the bit position is equal to zero and a value equal to two when the value of the bit position is equal to one; and setting the dividend X equal to a sum of the outputs for the respective bit positions, wherein the output for each odd $i^{th}$ bit position of the n bit binary representation is obtained by providing the value of the odd $i^{th}$ bit position to a shifter of the circuitry that performs a binary left shift operation.

10. The apparatus of claim 9, wherein a value of p is equal to one when (A) is performed a first time, and wherein the circuitry is configured to control:

(B) when $N \leq X^{(p)} < 2^{\lceil log_2 N \rceil}$ is determined to be true, determining a final remainder X mod N to be equal to zero, in which $X^{(p)}$ is a value of X when (A) is performed a $p^{th}$ time, and when $N \leq X^{(p)} < 2^{\lceil log_2 N \rceil}$ is determined not to be true, performing (A) and then performing (B), in which p is incremented by one each time (A) is performed after (A) is performed the first time, and (A) is performed not more than three times.

11. The apparatus of claim 10, wherein, when (B) is performed, p is equal to 3 and $N \leq X^{(p)} < 2^{\lceil log_2 N \rceil}$ is determined not to be true, the final remainder X mod N is determined to be equal to $X^{(p)}$.

12

12. The apparatus of claim 9, wherein, when (A) is performed a given time, the sum of the outputs for the respective bit positions at the given time (A) is performed is determined by an adder of the circuitry.

13. An apparatus for computation of a remainder of dividing a dividend X by a divisor N when processing a signal obtained from a processing system, the apparatus comprising:

circuitry configured to control, for an n bit binary representation of the dividend X:

for each $i^{th}$ bit position of the n bit representation input in an n bit register, when a value of the bit position at the n bit register is equal to 1, outputting, as an output of the register for the bit position, a weight of the bit position, and when a value of the bit position at the n bit register is equal to 0, outputting, as the output of the register for the bit position, a value equal to zero, in which the weights of the bit positions are respectively equal to $2^i$ modulo N, wherein i=0, 1, ..., n−1; and wherein the circuitry is configured to control determining, as the remainder, a sum of predetermined outputs of the outputs for the respective bit positions by an adder having a bit size equal to a number of the predetermined outputs, in which the predetermined outputs include all of the outputs, in which a number of all of the outputs is n, except each at least two outputs of the outputs forming a modulo N bit pair, and in which the at least two outputs forming a given modulo N bit pair (i) are obtained for bit positions of the dividend having a value equal to one and (ii) have respective weights, in which a sum of the respective weights is equal to N.

14. The apparatus of claim 13, wherein the at least two outputs forming the given modulo N bit pair correspond to at least two adjacent first and second bit positions of the n bit binary representation of the dividend.

15. A communication device comprising:

a receiver to receive a signal; and a processing device to control computation of a remainder of dividing a dividend X by a divisor N when processing the signal:

wherein the processing device is configured to control:

(A) for each $i^{th}$ bit position of an n bit binary representation of the dividend X:

when a value of the bit position is equal to 1, outputting, as an output for the bit position, a weight of the bit position, and when a value of the bit position is equal to 0, outputting, as the output for the bit position, a value equal to zero, in which the weights of the $i^{th}$ bit positions respectively are residues of $2^i$ mod N, wherein i=0, 1, ..., n−1; and setting the dividend X equal to a sum of the outputs for the respective bit positions; and wherein a value of p is equal to one when (A) is performed a first time, and wherein the processing is configured to control:

(B) when $N \leq X^{(p)} < 2^{\lceil log_2 N \rceil}$ is determined to be true, subtracting N from the dividend X to obtain a final remainder X mod N, in which $X^{(p)}$ is equal to the value of X when (A) is performed a $p^{th}$ time, and when $N \leq X^{(p)} < 2^{\lceil log_2 N \rceil}$ is determined not to be true, performing (A) and then performing (B), in which p is incremented by one each time (A) is performed after (A) is performed the first time, wherein, when (A) is performed a given time, the sum of the outputs for the respective bit positions at the given time (A) is performed is determined by an adder, in which the adder has a bit size according to a value of p corresponding to the given time (A) is performed and is supplied with the outputs for the respective bit positions at the given time (A) is performed.

16. A communication device comprising:

a receiver to receive a signal; and a processing device for modulo 3 computation of a remainder of dividing a dividend X by a divisor N when processing the signal, wherein the processing device is configured to control:

(A) for each even $i^{th}$ bit position of an n bit binary representation of the dividend X:

outputting, as an output for the bit position, a value of the bit position, and for each odd $i^{th}$ bit position of the n bit binary representation of the dividend X outputting, as the output for the bit position, a value equal to zero when the value of the bit position is equal to zero and a value equal to two when the value of the bit position is equal to one; and setting the dividend X equal to a sum of the outputs for the respective bit positions, wherein the output for each odd $i^{th}$ bit position of the n bit binary representation is obtained by providing the value of the odd $i^{th}$ bit position to a shifter that performs a binary left shift operation.

17. A communication device comprising:

a receiver to receive a signal; and a processing device for computation of a remainder of dividing a dividend X by a divisor N when processing the signal, wherein the processing device is configured to control, for an n bit binary representation of the dividend X:

for each $i^{th}$ bit position of the n bit representation input in an n bit register, when a value of the bit position at the n bit register is equal to 1, outputting, as an output of the register for the bit position, a weight of the bit position, and when a value of the bit position at the n bit register is equal to 0, outputting, as the output of the register for the bit position, a value equal to zero, in which the weights of the bit positions are respectively equal to $2^i$ modulo N, wherein i=0, 1, . . . , n−1; and wherein the processing device is configured to control, determining, as the remainder, a sum of predetermined outputs of the outputs for the respective bit positions by an adder having a bit size equal to the number of the predetermined outputs, in which the predetermined outputs include all of the outputs, in which a number of all of the outputs is n, except each at least two outputs of the outputs forming a modulo N bit pair, and in which the at least two outputs forming a given modulo N bit pair (i) are obtained for bit positions of the dividend having a value equal to one and (ii) have respective weights, in which a sum of the respective weights is equal to N.

\* \* \* \* \*